(12) United States Patent
Zieba et al.

(10) Patent No.: US 12,578,519 B2
(45) Date of Patent: Mar. 17, 2026

(54) OPTICAL COATING FOR ORGANIC SURFACE TREATMENTS

(71) Applicant: VIAVI SOLUTIONS INC., San Jose, CA (US)

(72) Inventors: Jaroslaw Zieba, Santa Rosa, CA (US); Markus Bilger, Santa Rosa, CA (US); Marius Grigonis, Santa Rosa, CA (US); Andrew David Clark, Santa Rosa, CA (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 702 days.

(21) Appl. No.: 16/810,212

(22) Filed: Mar. 5, 2020

(65) Prior Publication Data

US 2021/0278577 A1 Sep. 9, 2021

(51) Int. Cl.

| | |
|---|---|
| *G02B 5/20* | (2006.01) |
| *C09D 5/00* | (2006.01) |
| *C09D 5/32* | (2006.01) |
| *C09D 7/61* | (2018.01) |
| *G02B 1/11* | (2015.01) |
| *G02B 1/18* | (2015.01) |

(52) U.S. Cl.
CPC .............. *G02B 5/208* (2013.01); *C09D 5/00* (2013.01); *C09D 5/006* (2013.01); *C09D 5/32* (2013.01); *C09D 7/61* (2018.01); *G02B 1/11* (2013.01); *G02B 1/18* (2015.01)

(58) Field of Classification Search
CPC .......... G02B 5/285; G02B 5/283; G02B 5/26; G02B 1/10; G02B 5/226; G02B 5/208; G02B 1/11; G02B 1/116; G02B 1/14; G02B 1/18; C09D 7/61; C09D 7/48; C09D 5/006; C09D 5/00; C09D 5/32
USPC ......................................................... 359/359
See application file for complete search history.

(56) References Cited

U.S. PATENT DOCUMENTS

| | | |
|---|---|---|
| 4,747,674 A | 5/1988 | Butterfield et al. |
| 11,041,718 B2 | 6/2021 | Send et al. |
| 11,360,242 B2 | 6/2022 | Zieba et al. |
| 2003/0012936 A1 | 1/2003 | Draheim et al. |

(Continued)

FOREIGN PATENT DOCUMENTS

| | | |
|---|---|---|
| CN | 1742215 A | 3/2006 |
| CN | 101276005 A | 10/2008 |

(Continued)

OTHER PUBLICATIONS

TDMA: How titanium dioxide protects your outdoor plastics [online], [retrieved on Nov. 18, 2022]. Retrieved from the internet: < URL: https://tdma.info/how-titanium-dioxide-protects-your-outdoor-plastics/.> (Year: 2022).*

(Continued)

*Primary Examiner* — Colin W. Slifka
(74) *Attorney, Agent, or Firm* — Mannava & Kang, P.C.

(57) ABSTRACT

An optical device including a substrate; an optical coating including materials that absorb light in an ultraviolet wavelength and reduces an amount of the light reflected from the optical coating; and an organic functional coating is disclosed. A method of making an optical device a method of increasing durability to ultraviolet light exposure in an optical device are also disclosed.

20 Claims, 3 Drawing Sheets

(56) References Cited

U.S. PATENT DOCUMENTS

| | | | |
|---|---|---|---|
| 2003/0116270 A1 | 6/2003 | Hawa et al. | |
| 2005/0018131 A1* | 1/2005 | Ishak | G02C 7/108 |
| | | | 351/159.62 |
| 2006/0204766 A1 | 9/2006 | Zieba et al. | |
| 2008/0252985 A1 | 10/2008 | Zhu et al. | |
| 2009/0104438 A1 | 4/2009 | Lalli et al. | |
| 2009/0162560 A1* | 6/2009 | DeLuca | C09D 7/67 |
| | | | 524/837 |
| 2009/0188726 A1 | 7/2009 | Chang et al. | |
| 2010/0003508 A1* | 1/2010 | Arrouy | G02B 1/16 |
| | | | 427/535 |
| 2010/0253600 A1 | 10/2010 | Seder et al. | |
| 2012/0127578 A1 | 5/2012 | Bright et al. | |
| 2012/0156100 A1* | 6/2012 | Tsai | G01N 21/6454 |
| | | | 977/840 |
| 2012/0250314 A1 | 10/2012 | Maikowski et al. | |
| 2013/0141693 A1 | 6/2013 | McCabe et al. | |
| 2014/0014824 A1 | 1/2014 | Huang et al. | |
| 2014/0014838 A1 | 1/2014 | Hendrix et al. | |
| 2014/0090864 A1 | 4/2014 | Paulson | |
| 2014/0320845 A1 | 10/2014 | Bayha et al. | |
| 2015/0276987 A1 | 10/2015 | McKenzie et al. | |
| 2016/0152002 A1 | 6/2016 | Inui et al. | |
| 2016/0154254 A1* | 6/2016 | Bolshakov | G02B 1/11 |
| | | | 351/159.66 |
| 2016/0319421 A1 | 11/2016 | Mildebrath et al. | |
| 2016/0320621 A1* | 11/2016 | Biteau | G02C 11/10 |
| 2016/0377889 A1 | 12/2016 | Lazar | |
| 2017/0176184 A1 | 6/2017 | Lee et al. | |
| 2018/0024270 A1 | 1/2018 | Ray et al. | |
| 2019/0127845 A1 | 5/2019 | Shuto et al. | |
| 2022/0291423 A1 | 9/2022 | Zieba et al. | |
| 2025/0123425 A1 | 4/2025 | Zieba et al. | |

FOREIGN PATENT DOCUMENTS

| | | | | |
|---|---|---|---|---|
| CN | 1685252 B | 9/2011 | | |
| EP | 2624020 A1 | 8/2013 | | |
| EP | 2831708 A1 | 2/2015 | | |
| EP | 3187909 A1 | 7/2017 | | |
| EP | 3206060 A1 | 8/2017 | | |
| EP | 3407100 A1 | 11/2018 | | |
| FR | 2909187 A1 * | 5/2008 | | B05D 3/0254 |
| JP | H0738788 A | 2/1995 | | |
| JP | H09230031 A | 9/1997 | | |
| JP | 2002071940 A | 3/2002 | | |
| JP | 2002254573 A | 9/2002 | | |
| JP | 2003004942 A | 1/2003 | | |
| JP | 2003521679 A | 7/2003 | | |
| JP | 2004198617 A | 7/2004 | | |
| JP | 2005199572 A | 7/2005 | | |
| JP | 2006194639 A | 7/2006 | | |
| JP | 2008268277 A | 11/2008 | | |
| JP | 2009054902 A | 3/2009 | | |
| JP | 2014145955 A | 8/2014 | | |
| JP | 2015040945 A | 3/2015 | | |
| JP | 2015506459 A | 3/2015 | | |
| JP | 2016224113 A | 12/2016 | | |
| JP | 2017175515 A | 9/2017 | | |
| JP | 2018031888 A | 3/2018 | | |
| KR | 101611208 B1 | 4/2016 | | |
| TW | 446637 B | 7/2001 | | |
| TW | I522237 B | 2/2016 | | |
| TW | I557445 B | 11/2016 | | |
| TW | I604948 B | 11/2017 | | |
| WO | 2013087799 A1 | 6/2013 | | |
| WO | 2013151984 A2 | 10/2013 | | |
| WO | 2013169987 A1 | 11/2013 | | |
| WO | WO-2016014713 A1 * | 1/2016 | | A61N 5/0618 |
| WO | 2016129699 A1 | 8/2016 | | |
| WO | 2017145910 A1 | 8/2017 | | |
| WO | 2017183145 A1 | 10/2017 | | |
| WO | 2017218433 A1 | 12/2017 | | |
| WO | 2018052057 A1 | 3/2018 | | |

OTHER PUBLICATIONS

Grabowska et al., Metal oxide photocatalysts, 2018, Metal Oxide-Based Photocatalysis [online], [retrieved on Nov. 18, 2022]. Retrieved from the internet: < URL: https://www.sciencedirect.com/topics/materials-science/tantalum-oxides/.> (Year: 2022).*

Raba-Paez et al., Niobium Pentoxide Samples with Addition of Manganese at Different Concentrations and Calcination Temperatures Applied in the Photocatalytic Degradation of Rhodamine B, 2020, Appl. Sci., 10, 4257 (Year: 2020).*

Daikin Global: OPTOOL anti-smudge coating [online], [retrieved on Nov. 18, 2022]. Retrieved from the internet: < URL: https://www.daikinchemicals.com/solutions/products/optool-anti-smudge-coating.html.> (Year: 2022).*

Daikin: OPTOOL DSX Safety data sheet [online], [retrieved on Nov. 18, 2022]. Retrieved from the internet: < URL: https://www.daikinchemicals.com/library/pb_common/pdf/sds/OPTOOL_anti-smudge_coating/sds-optool-dsx-E_20150713.pdf.> (Year: 2022).*

PubChem: Perflexane [online], [retrieved on Nov. 18, 2022]. Retrieved from the internet: < URL: https://pubchem.ncbi.nlm.nih.gov/compound/Perflexane.> (Year: 2022).*

Siefke et al. 2016: Thin film; n,k 0.120-125 µm [online], [retrieved on Nov. 18, 2022]. Retrieved from the internet: < URL: https://refractiveindex.info/?shelf=main&book=TiO2&page=Siefke.> (Year: 2022).*

Flores: What Are Spectacles? What Are the Parts of Spectacles? [online], [capture from Feb. 7, 2018]. Retrieved from the Internet < URL: https://web.archive.org/web/20180207131816/https://www.healthguidance.org/entry/10008/1/what-are-spectacles-what-are-the-parts-of-spectacles.html> (Year: 2018).*

Machine translation of FR 2909187 A1 originally published May 2008 to Berit et al. (Year: 2008).*

REI: How to Choose Sunglasses [online], [retrieved on Aug. 19, 2024]. Retrieved from the internet: < URL: https://www.rei.com/learn/expert-advice/sunglasses.html#:~:text=0%2D19%25%20VLT%3A%20Ideal,very%20dim%20and%20night%20conditions.> (Year: 2024).*

Solar Bat: Protect Your Eyes: What to Know about Solar Eclipse Glasses [online], [Nov. 1, 2023]. Retrieved from the internet: < URL: https://www.solarbat.com/blogs/news/everything-about-solar-eclipse-glasses> (Year: 2023).*

* cited by examiner

OPTICAL COATING FOR ORGANIC SURFACE TREATMENTS

FIELD OF THE INVENTION

The present disclosure generally relates to an optical device including a substrate; an optical coating including materials that absorb light in an ultraviolet wavelength and reduces an amount of the light reflected from the optical coating; and an organic functional coating is disclosed. A method of making an optical device, and a method of increasing durability to ultraviolet light exposure in an optical device are also disclosed.

BACKGROUND OF THE INVENTION

Optical devices are frequently treated with a functional coating, such as a surface treatment, for example, a hydrophilic, hydrophobic, oleophobic, anti-smudge, anti-soiling treatment. These functional coatings are generally designed with the purpose of providing optimum properties, such as minimum reflectance in anti-reflective (AR) coatings in the visible and near infrared (IR) part of the spectrum. Due to their location, generally, as an external layer on optical devices, these functional treatments should be durable against exposure to ultraviolet (UV) irradiation. Generally, the functional coatings have been optimized, based upon the chemistry of the materials used, in order to reduce their absorption coefficients in the spectral range for UV-A (315 nm to 400 nm) and UV-B (280 nm to 315 nm). Alternatively, the functional coatings include chemical structures that offer efficient dissipation mechanisms for the absorbed UV radiation. However, as shown in FIG. 1, these options are not completely effective in reducing the UV radiation 16 that transmits through the organic functional coating 14 and to an underlying optical coating 12. The optical coating 12 reflects a substantial part of the incoming UV radiation 16 back to the organic functional coating 14, which results in degradation of the functional coating. For example, if the organic functional coating 14 includes organic molecules, then the organic functional coating 14 is exposed to the UV radiation 16 from the atmosphere and then the UV radiation that is reflected back from the surface of the optical coating 12.

What is needed is an optical coating that is designed to be highly durable against exposure to incoming UV radiation as well as reducing the amount of UV radiation reflected from the optical coating in the UV-A and UV-B spectral ranges towards a functional coating.

SUMMARY OF THE INVENTION

In an aspect, there is disclosed an optical device comprising: a substrate; an optical coating including materials that absorb light in an ultraviolet wavelength and reduces an amount of the light reflected from the optical coating; and an organic functional coating.

In another aspect, there is disclosed a method of making an optical device, comprising: applying onto a substrate an optical coating including materials that absorb light in an ultraviolet wavelength and reduce an amount of the light reflected from the optical coating; and applying onto the optical coating an organic functional coating.

In another aspect, there is disclosed a method of increasing durability to ultraviolet light exposure in an optical device, comprising: applying onto a substrate an optical coating including materials that absorb light in an ultraviolet wavelength and reduce an amount of the light reflected from the optical coating; and applying onto the optical coating an organic functional coating to form the optical device, wherein the optical device exhibits increased durability as compared to an optical device that does not include materials that absorb light in an ultraviolet wavelength and reduce an amount of the light reflected from the optical coating.

Additional features and advantages of various embodiments will be set forth, in part, in the description that follows, and will, in part, be apparent from the description, or can be learned by the practice of various embodiments. The objectives and other advantages of various embodiments will be realized and attained by means of the elements and combinations particularly pointed out in the description herein.

BRIEF DESCRIPTION OF THE DRAWINGS

The present disclosure in its several aspects and embodiments can be more fully understood from the detailed description and the accompanying drawings, wherein.

Throughout this specification and figures like reference numbers identify like elements.

DETAILED DESCRIPTION OF THE INVENTION

It is to be understood that both the foregoing general description and the following detailed description are exemplary and explanatory only, and are intended to provide an explanation of various embodiments of the present teachings. The layers/components shown in each Figure may be described with regard to a particular Figure, but it is understood that the description of a particular layer/component would be applicable to the equivalent layer/component in the other Figures. In its broad and varied embodiments, disclosed herein are optical coatings for an optical device; and a method of manufacturing the optical device including the optical coating.

Figure 1:
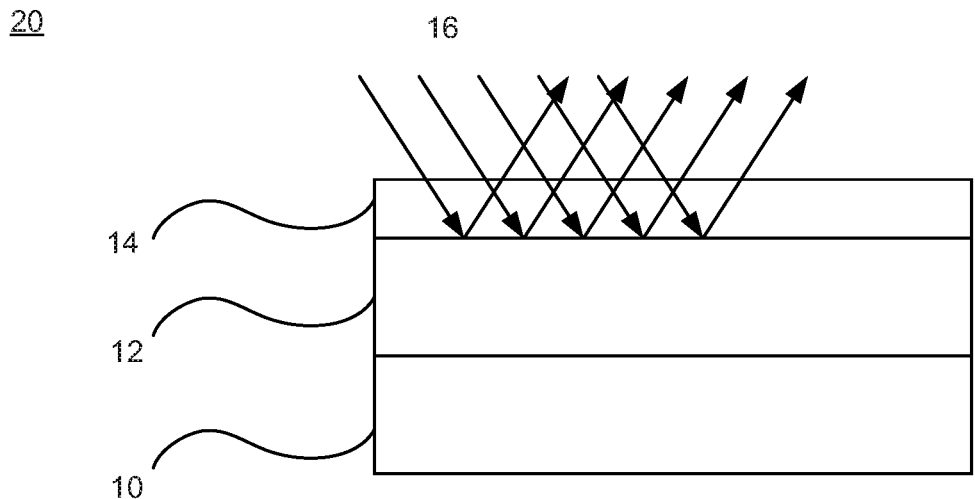
FIG. 1 is a cross-section of an optical device according to the prior art.
Figure 2:
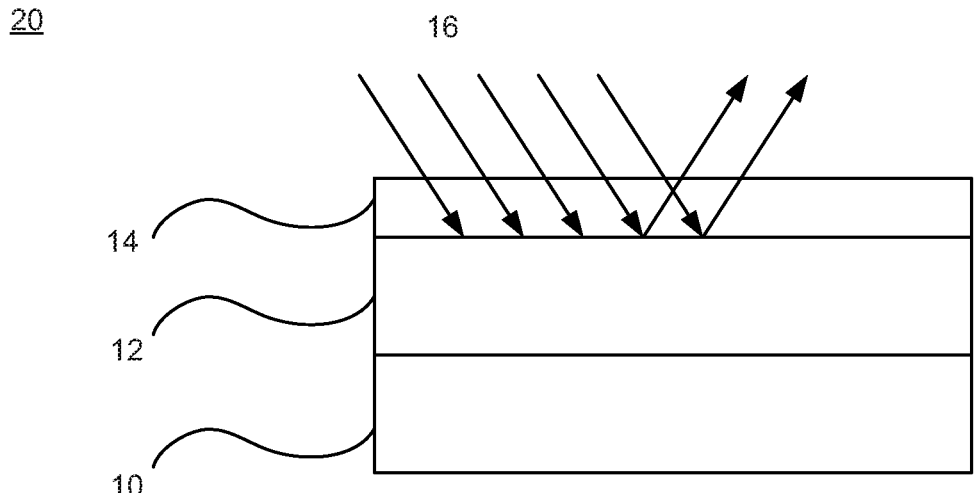
FIG. 2 is a cross-section of an optical device according to an aspect of the invention.

As shown in FIG. 2, an optical device 20 can include a substrate 10; an optical coating 12 including materials that absorb light in an ultraviolet wavelength and reduce an amount of light reflected from the optical coating; and an organic functional coating 14. In an aspect, the optical coating 12 can have low reflectance in an ultraviolet wavelength. In an aspect, the optical coating 12 can have low transmittance in an ultraviolet wavelength. In a further aspect, the optical coating 12 can have both low reflectance and low transmittance in an ultraviolet wavelength. The term "low", and its variations, is understood to mean less than 50%, such as less than 40%, and as an example, less than 30% reflectance and/or transmittance in the ultraviolet wavelength. In another aspect, the optical coating 12 can have a high level of absorption in the ultraviolet wavelength. The term "high", and its variations is understood to mean greater than or equal to 50%, for example, greater than 60%, and as a further example, greater than 75% absorption in the ultraviolet wavelength.

The substrate 10 of the optical device 20 can be any material capable of being coated. Non-limiting examples of substrates 10 include plastics, synthetic sapphire, glass, synthetic diamond, optical ceramic materials, optical quality polymers, and light transmitting substrates with absorption spectra as required by the functional application of the optical device 20, such as silicon. Optical quality polymers include polycarbonates, acrylates, and cyclic olefin polymers. Various types of glass can be used including chemically strengthened glass.

In an aspect, the optical device 20 can include more than one substrate 10. The inclusion of more than one substrate 10 can improve the safety of the optical device 20. Additionally, the inclusion of more than one substrate 10 in the optical device 20 can increase the structural strength and/or flexibility of the optical device 20. The optical device 20 can include two or more substrates 10 that can be a laminate. In an aspect, an adhesive can be included between the two or more substrates 10 to form the laminate. If an adhesive is present, then the adhesive should not affect a property of the optical coating 12. A laminate substrate can provide a thinner and stronger optical device 20. However, the thickness of a single substrate or a laminate substrate is not a limiting factor in selecting a substrate 10 suitable for the optical device 20.

The substrate 10 for use in the optical device 20 can be selected based upon safety, cost, weight, etc. The selection of the substrate 10 is a variable in the formation of the optical device 20. In particular, the selection of the substrate 10 can change the design of the optical coating 12 in the optical device 20.

The disclosed optical device 20 can include an optical coating 12 that can include materials that absorb light in an ultraviolet wavelength and reduce an amount of the light reflected from the optical coating. The materials that absorb light can have a low absorption coefficient in the ultraviolet wavelength. Additionally, or alternatively, the materials that absorb light can have a chemical structure that can dissipate energy absorbed in the ultraviolet wavelength. Non-limiting examples of materials that absorb light in an ultraviolet wavelength include at least one material chosen from hydrogenated silicon, amorphous silicon, germanium, tantalum, niobium, $TiO_2$, $Nb_2O_5$, $Ta_2O_5$, and ITO. In an aspect, the optical coating 12 can be a dielectric stack of materials that absorb light in the ultraviolet wavelength. The dielectric stack can include alternating layers of different metal oxides. Each metal oxide in the dielectric stack can absorb light in the ultraviolet wavelength. In an aspect, the material that absorbs light in the ultraviolet wavelength can be a high refractive index material.

The disclosed optical device 20 can include an optical coating 12, such as at least one optical coating 12, that can provide at least one optical function. The optical coating 12 can include one or more optical coatings in order to provide multiple optical functions to the optical device 20. The optical coating 12 can provide an optical function, for example, when present on a same side of the optical device 20 as the environment, relative to the substrate. In an aspect, the optical coating 12 can be present on the substrate 10, for example, without any intervening layers. The optical coating 12 can be a coating chosen from anti-reflection, longwave pass, shortwave pass, bandpass, notch, multiband, order suppression, non-polarizing beamsplitter, and polarizing beamsplitter.

An anti-reflection coating can be a dielectric stack and can reduce the light reflection on an interface with the substrate 10. Suitable dielectrics for forming the dielectric stack include layers of metal oxides. Non-limiting examples of metal oxides include oxides include titanium dioxide ($TiO_2$), zirconium dioxide ($ZrO_2$), niobium pentoxide ($Nb_2O_5$), tantalum pentoxide ($Ta_2O_5$), hafnium dioxide ($HfO_2$), aluminum trioxide ($Al_2O_3$), silicon dioxide ($SiO_2$), scandium trioxide ($Sc_2O_3$), yttrium trioxide ($Y_2O_3$), magnesium dioxide ($MgO_2$), $SiAlO_x$, $SiO_xN_y$, $SiAlO_xN_y$, and mixtures thereof. The dielectric stack can include two alternating layers of alternating different metal oxides, for example, in an aspect, with a top layer of aluminum trioxide or a top layer of silicon dioxide. In another aspect, the anti-reflection coating can be formed of a stack of layers of $NbTiO_x$, $SiO_2$, or the like. In an aspect, the antireflective coating 30e can be a thin film dielectric stack of a first layer of $NbTiO_x$ of about 50 nm, a first layer of $SiO_2$ of about 18 nm, a second layer of $NbTiO_x$ of about 16 nm, a second layer of $SiO_2$ of about 101 nm.

The optical coating 12 can be a bandpass filter, which can be a full stack of dielectric low and high refractive materials. Each layer can be deposited as a quarter-wave (QW) thickness at the wavelength of the desired filter. Each partial-reflector, which may be comprised of only a single layer, is called a quarter-wave stack (QWS). The bandwidth of the filter is a function of the reflectance of quarter-wave stacks in the structure. The center wavelength of the pass-band is determined by the thickness of the spacer dielectric material. The dielectric materials used for the quarter and/or half-wave layers have indices of refraction in the range 1.3 to beyond 4.0. For example, some suitable materials are: Magnesium Fluoride (1.38), Thorium Fluoride (1.47), Cryolite (1.35), Silicon Dioxide (1.46), Aluminum Oxide (1.63), Hafnium Oxide (1.85), Tantalum Pentoxide (2.05), Niobium Oxide (2.19), Zinc Sulphide (2.27), Titanium Oxide (2.37), Silicon (3.5), Germanium (4.0), and Lead Telluride (5.0). Other dielectric materials would serve as well. In an aspect, the bandpass filter can be a polymeric coating containing an appropriate mixture of dyes to create required absorbance or a combination of dielectric and polymeric structures.

The bandpass filter can allow a wavelength of light at which a sensor operates pass and can eliminate all other wavelengths. For example, the bandpass filter 30d can block wavelengths in the visible and near IR spectral range, such as from about 400 to about 850 nm, and can transmit wavelengths above 850 nm. In this manner, the bandpass filter 30d can reduce and/or eliminate unwanted radiation from reaching a sensor attached to the optical device 20.

The disclosed optical device 20 can include an organic functional coating 14, such as at least one organic functional coating 14, that can provide at least one function. The organic functional coating 14 can include one or more functional coatings in order to provide multiple optical functions to the optical device 20. The organic functional coating 14 can provide a function chosen from hydrophilicity, hydrophobicity, oleophobicity, anti-smudge, anti-bacterial, anti-fungal, and anti-soiling. The organic functional coating 14 can include material that transmits light in the ultraviolet wavelength.

The organic functional coating 14 can be present on the optical coating 12, for example, without any intervening layers. The organic functional coating 14 can be more durable against ultraviolet degradation because of the presence of the optical coating 12.

In an aspect, the optical device 20 can include an optical coating 12 that is an anti-reflection coating and an organic functional coating 14 that is anti-smudge coating.

In an aspect, the organic functional coating 14 can be an electrical conducting coating. The electrical conducting coating can be a low surface energy treatment that serves as a soil, water, and dust repelling surface. This coating can have a low coefficient of friction, such as less than 0.08. In this manner, the electrical conducting coating can reduce the susceptibility of the optical device 20 to being damaged by an abrasive media.

The electrical conducting coating can include indium tin oxide (ITO), nano-particles based transparent composites, and other commonly used optically transparent conductors. In an aspect, the electrical conducting coating can be transparent at a wavelength of operation of a LIDAR sensor, such as between about 850 nm to about 2000 nm.

The electrical conducting coating can act as a heating element to increase a temperature of the optical device 20, such as from about 30° C. to 80° C. As a heating element, an optical device 20 including this organic functional coating 14 can be used to eliminate and/or reduce at least one of: the risk of fogging of a window with an attached sensor, risk of moisture condensation, and increase soil repellency of the optical device 20. Additionally, this electrical conducting coating 14 can increase the hydrophobicity and oleophobicity by increasing the efficiency in repelling water and contaminants.

The optical device 20 can be attached to another device to form an optical system. The other device can be a window, a sensor (e.g. LIDAR sensor), or a lens, for example, a self-standing optical lens, or a lens. The optical device 20 can be attached to the other device using conventional deposition processes.

A method of making an optical device 20 is also disclosed. The optical device 20 can be formed using semiconductor processes. In an aspect, the method of making an optical device 20 can include applying onto a substrate 10 an optical coating 12 including materials that absorb light in an ultraviolet wavelength and reduces an amount of the light reflected from the optical coating 12; and applying onto the optical coating 12 an organic functional coating 14. The optical coating 12 and the organic functional coating 14 are as described above with regard to the optical device 20. In an aspect, the organic functional coating 14 can be on a same side of the optical device 20 as the environment, relative to the substrate 10.

A method of increasing durability to ultraviolet exposure is an optical device 20 can include applying onto a substrate 10 an optical coating 12 including materials that absorb light in an ultraviolet wavelength and reduces an amount of the light reflected from the optical coating 12; and applying onto the optical coating 12 an organic functional coating 14 to form the optical device 20, wherein the optical device 20 can exhibit increased durability as compared to an optical device 20 that does not include materials that absorb light in an ultraviolet wavelength and reduces an amount of the light reflected from the optical coating 12. In an aspect, the optical device 20 can exhibit increased abrasion resistance as compared to an optical device 20 that does not include materials that absorb light in an ultraviolet wavelength.

A method of making an optical system is also disclosed. The optical device 20 can be attached to another device by conventional deposition processes to form the optical system.

EXAMPLE

Example 1—UV Durability

Four optical devices (A, B, C, and D) were made having a functional coating and an optical coating. For all of the optical devices, the functional coating was an anti-smudge treatment called UD120, which is commercially available from Daikin Industries. Each of the four optical devices included a different optical coating, only one of which (D-inventive) included materials that absorb light in an ultraviolet wavelength and reduce an amount of the ultraviolet light reflected from the optical coating. A fifth optical device (E) was made having the same functional coating, but did not include an optical coating. The five optical devices were exposed to continuous illumination by UVB (280 to 315 nm) radiation with a power density of 5 W/cm$^2$. Optical devices A, B, C, and E were able to last 48 hours before the functional coating degraded. Optical device D was able to last twice as long, 96 hours, before the functional coating degraded.

Figure 3:
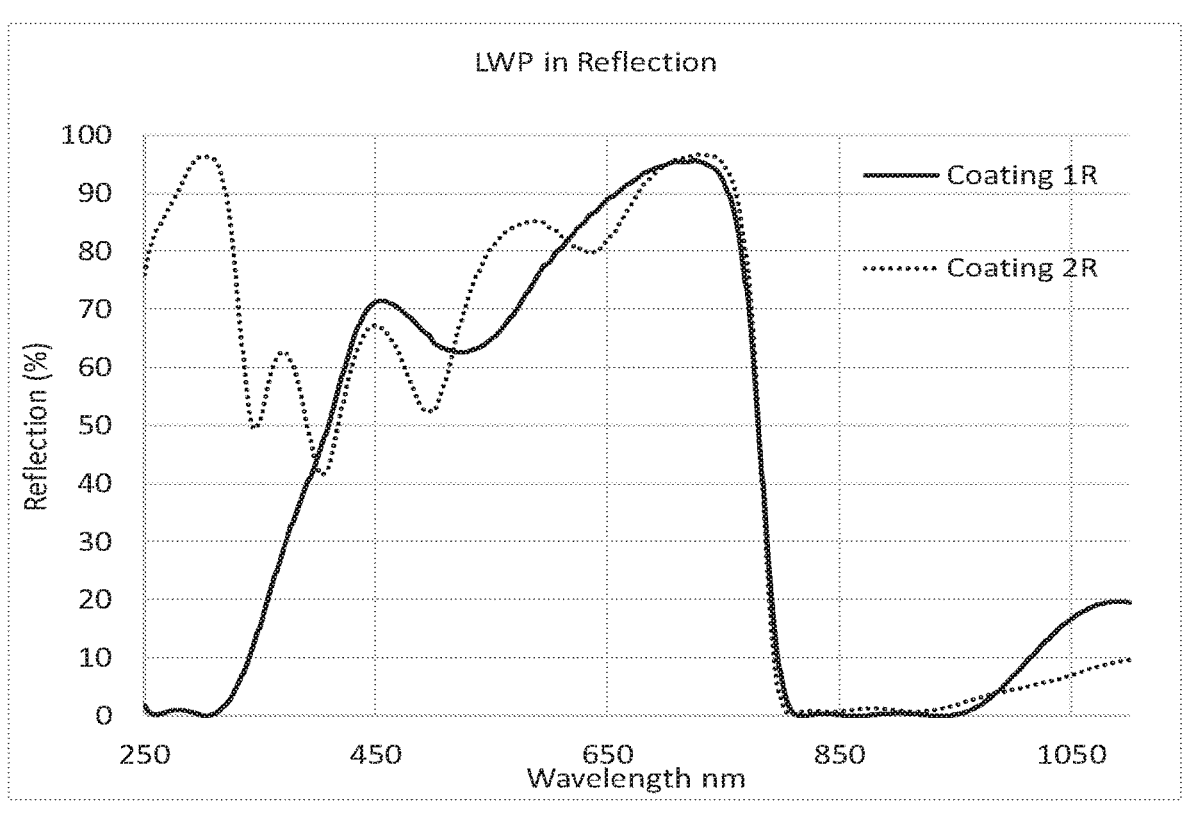
FIG. 3 is a graph showing percent reflection of an optical device according to an aspect of the invention.
Figure 4:
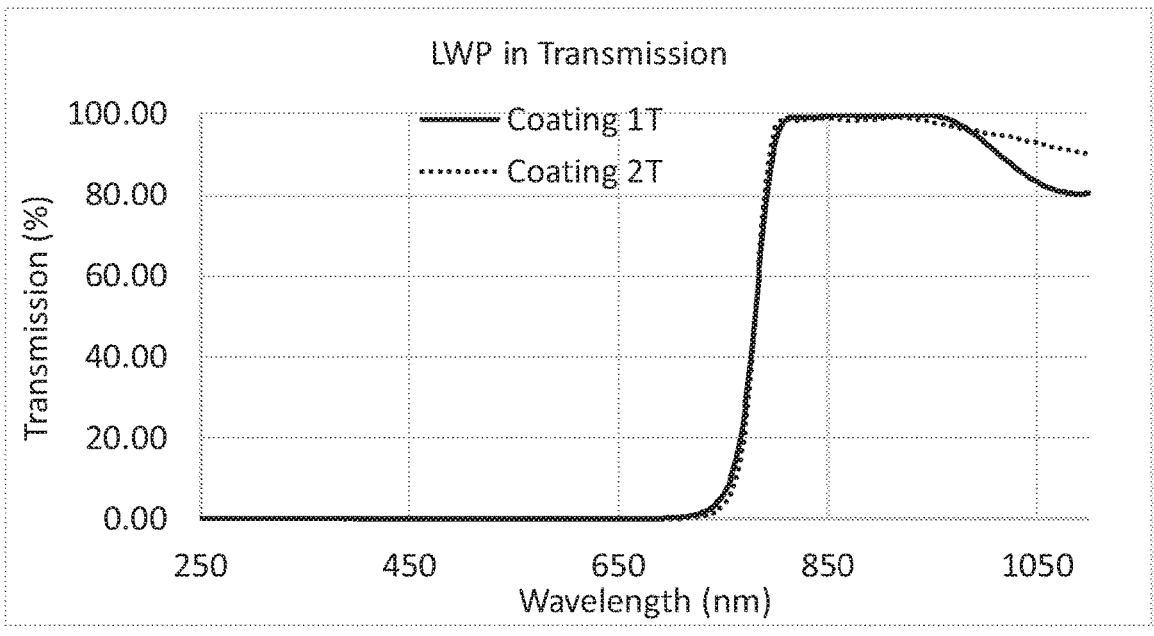
FIG. 4 is graph showing percent transmission of an optical device according to an aspect of the invention.
Figure 5:
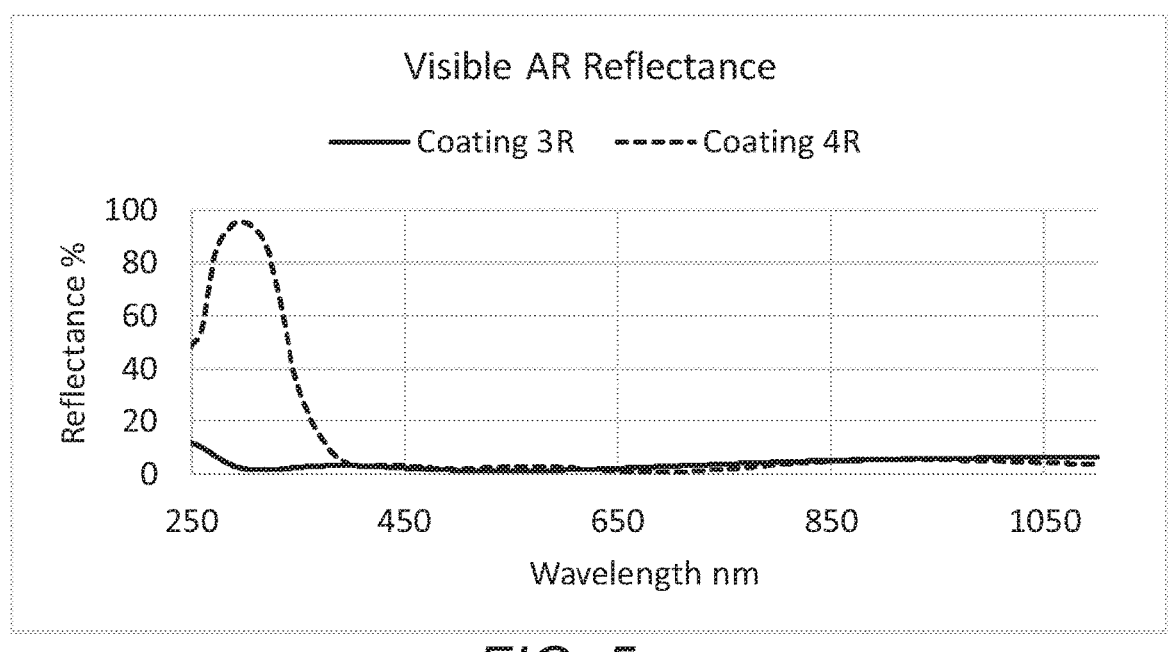
FIG. 5 is a graph showing percent reflection of an optical device according to an aspect of the invention.
Figure 6:
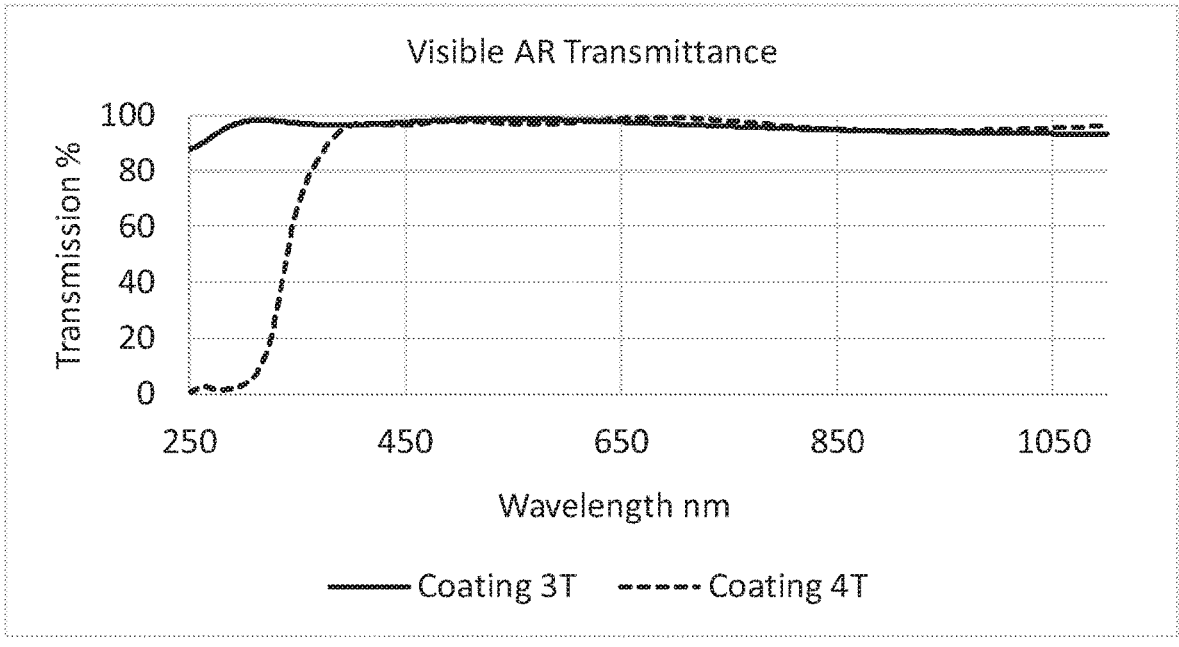
FIG. 6 is graph showing percent transmission of an optical device according to an aspect of the invention.

The optical coating of optical device D had both lower reflectance and lower transmittance in the UV-B part of the spectrum. For example, an inventive optical coating can be a longwave pass with niobioum pentoxide and aluminum oxide, illustrated as coating 1R in FIG. 3 and coating 1T in FIG. 4. Coatings 2R and 2T are comparative. As another example, an inventive optical coating can be an anti-reflection coating with tantalum pentoxide and silicon dioxide, illustrated as coating 3R in FIG. 5 and coating 3T in FIG. 6. Coatings 4R and 4T are comparative.

Example 2—Abrasion Resistance

The same five optical devices (A, B, C, D, and E) were subjected to abrasion resistance test. A steel wool pad under a defined load was rubbed against the functional coating of each optical device. The results indicated that the optical device D had the highest value, i.e., 20,000. Optical devices A-B had values of 16,000, 12,000, and 10,000, respectively. Optical device E had a value of less than 2,000.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications can be made without departing from the scope of the teachings herein.

This scope disclosure is to be broadly construed. It is intended that this disclosure disclose equivalents, means, systems and methods to achieve the devices, activities and mechanical actions disclosed herein. For each device, article, method, mean, mechanical element or mechanism disclosed, it is intended that this disclosure also encompass in its disclosure and teaches equivalents, means, systems and methods for practicing the many aspects, mechanisms and devices disclosed herein. Additionally, this disclosure regards a coating and its many aspects, features and elements. Such a device can be dynamic in its use and operation, this disclosure is intended to encompass the equivalents, means, systems and methods of the use of the device and/or optical device of manufacture and its many aspects consistent with the description and spirit of the operations and functions disclosed herein. The claims of this application are likewise to be broadly construed. The description of the inventions herein in their many embodiments is merely exemplary in nature and, thus, variations that do not depart from the gist of the invention are intended to be within the scope of the invention. Such variations are not to be regarded as a departure from the spirit and scope of the invention.

What is claimed is:

1. An optical device comprising:

a substrate;

an optical coating including materials that are capable of absorbing light in an ultraviolet wavelength and are capable of reducing an amount of the ultraviolet light reflected from the optical coating; and an organic functional coating;

wherein the optical coating is a coating chosen from longwave pass, bandpass, multiband, order suppression, non-polarizing beamsplitter, and polarizing beamsplitter, wherein if the optical coating is a bandpass filter, the bandpass filter is capable of blocking wavelengths over the entire range of from about 400 to about 850 nm; and wherein if the optical coating is a longwave pass, the longwave pass includes niobium pentoxide and aluminum oxide and is capable of providing substantially 0% transmission at wavelengths over the entire range of from about 250 nm to about 700 nm.

2. The optical device of claim 1, wherein the materials that are capable of absorbing light in an ultraviolet wavelength include at least one of hydrogenated silicon, amorphous silicon, germanium, tantalum, niobium, $TiO_2$, $Nb_2O_5$, $Ta_2O_5$, or ITO.

3. The optical device of claim 1, wherein the optical coating is present on the substrate.

4. The optical device of claim 1, wherein the organic functional coating is present on the optical coating.

5. The optical device of claim 1, wherein the materials that are capable of absorbing light in an ultraviolet wavelength have a chemical structure that is capable of dissipating energy absorbed in the ultraviolet wavelength.

6. The optical device of claim 1, wherein the organic functional coating provides a function chosen from hydrophilicity, hydrophobicity, oleophobicity, anti-smudge, anti-bacterial, anti-fungal, and anti-soiling.

7. The optical device of claim 1, wherein the organic functional coating is more durable against UV degradation because of the optical coating.

8. The optical device of claim 1, wherein the optical coating is an anti-reflection coating and the organic functional coating is an anti-smudge coating.

9. The optical device of claim 1, wherein the organic functional coating includes materials that transmit light in the ultraviolet wavelength.

10. The optical device of claim 1, wherein the optical coating is a coating chosen from longwave pass and bandpass.

11. The optical device of claim 1, wherein the optical coating is a dielectric stack of materials that are capable of absorbing light in the ultraviolet wavelength.

12. The optical device of claim 11, wherein the dielectric stack includes alternating layers of different metal oxides, wherein each metal oxide is capable of absorbing light in the ultraviolet wavelength.

13. The optical device of claim 1, wherein the material that is capable of absorbing light in an ultraviolet wavelength is chosen from Hafnium Oxide, Tantalum Pentoxide, Niobium Oxide, Zinc Sulphide, Titanium Oxide, Silicon, Germanium and Lead Telluride.

14. The optical device of claim 1, wherein the optical coating is the bandpass filter.

15. An optical system comprising the optical device of claim 1; and another device.

16. A method of making an optical device, comprising:

applying onto a substrate an optical coating including materials that are capable of absorbing light in an ultraviolet wavelength and are capable of reducing an amount of the light reflected from the optical coating; and applying onto the optical coating an organic functional coating;

wherein the optical coating is a coating chosen from longwave pass, bandpass, multiband, order suppression, non-polarizing beamsplitter, and polarizing beamsplitter, wherein if the optical coating is a bandpass filter, the bandpass filter is capable of blocking wavelengths over the entire range of from about 400 to about 850 nm; and wherein if the optical coating is a longwave pass, the longwave pass includes niobiuom pentoxide and aluminum oxide and is capable of providing substantially 0% transmission at wavelengths over the entire range of from about 250 nm to about 700 nm.

17. The method of claim 16 wherein the organic functional coating is exposed to an environment.

18. A method of increasing durability to ultraviolet light exposure in an optical device, comprising:

applying onto a substrate an optical coating including materials that are capable of absorbing light in an ultraviolet wavelength and are capable of reducing an amount of the light reflected from the optical coating; and applying onto the optical coating an organic functional coating to form the optical device, wherein the optical device exhibits increased durability as compared to an optical device that does not include materials that are capable of absorbing light in an ultraviolet wavelength and reducing an amount of the light reflected from the optical coating;

wherein the optical coating is a coating chosen from longwave pass, bandpass, multiband, order suppression, non-polarizing beamsplitter, and polarizing beamsplitter, wherein if the optical coating is a bandpass filter, the bandpass filter is capable of blocking wavelengths over the entire range of from about 400 to about 850 nm; and wherein if the optical coating is a longwave pass, the longwave pass includes niobium pentoxide and aluminum oxide and is capable of providing substantially 0% transmission at wavelengths over the entire range of from about 250 nm to about 700 nm.

19. The method of claim 18, wherein the optical device exhibits increased abrasion resistance as compared to an optical device that does not include materials that are capable of absorbing light in an ultraviolet wavelength.

20. The method of claim 18, wherein the materials that are capable of absorbing light include at least one material chosen from hydrogenated silicon, amorphous silicon, germanium, tantalum, niobium, $TiO_2$, $Nb_2O_5$, $Ta_2O_5$, and ITO.

* * * * *